US010391676B2

(12) United States Patent
Tamai et al.

(10) Patent No.: US 10,391,676 B2
(45) Date of Patent: Aug. 27, 2019

(54) FIBER-REINFORCED MULTILAYERED PELLET, MOLDED ARTICLE MOLDED THEREFROM, AND METHOD OF PRODUCING FIBER-REINFORCED MULTILAYERED PELLET

(71) Applicant: Toray Industries, Inc., Tokyo (JP)

(72) Inventors: Akiyoshi Tamai, Nagoya (JP); Kimihiko Hattori, Nagoya (JP); Kenichi Utazaki, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 314 days.

(21) Appl. No.: 15/115,298

(22) PCT Filed: Jan. 27, 2015

(86) PCT No.: PCT/JP2015/052157

§ 371 (c)(1),
(2) Date: Jul. 29, 2016

(87) PCT Pub. No.: WO2015/115408

PCT Pub. Date: Aug. 6, 2015

(65) Prior Publication Data

US 2017/0001336 A1 Jan. 5, 2017

(30) Foreign Application Priority Data

Feb. 3, 2014 (JP) ................................ 2014-018332

(51) Int. Cl.

| | |
|---|---|
| ***B29B 9/14*** | (2006.01) |
| ***B29B 9/06*** | (2006.01) |
| ***B29B 9/12*** | (2006.01) |
| *B29K 69/00* | (2006.01) |
| *B29K 77/00* | (2006.01) |
| *B29K 105/12* | (2006.01) |
| *B29K 307/04* | (2006.01) |

(52) U.S. Cl.

CPC ................ *B29B 9/14* (2013.01); *B29B 9/065* (2013.01); *B29B 9/12* (2013.01); *B29K 2069/00* (2013.01); *B29K 2077/00* (2013.01); *B29K 2105/122* (2013.01); *B29K 2307/04* (2013.01)

(58) Field of Classification Search

CPC .. B29B 9/065; B29B 9/12; B29B 9/14; B29K 2069/00; B29K 2077/00; B29K 2105/122; B29K 2307/04

See application file for complete search history.

(56) References Cited

U.S. PATENT DOCUMENTS

| | | | | | |
|---|---|---|---|---|---|
| 3,322,834 | A | | 5/1967 | Hill, Jr. et al. | |
| 3,354,129 | A | | 11/1967 | Edmonds et al. | |
| 3,919,177 | A | | 11/1975 | Campbell | |
| 5,679,456 | A | * | 10/1997 | Sakai | B29B 9/14 428/189 |
| 2006/0110599 | A1 | * | 5/2006 | Honma | B32B 5/10 428/413 |

FOREIGN PATENT DOCUMENTS

| | | | | |
|---|---|---|---|---|
| JP | 45-3368 | | | 2/1970 |
| JP | 52-12240 | | | 4/1977 |
| JP | 61-007332 | A | | 1/1986 |
| JP | 04-153007 | A | | 5/1992 |
| JP | 04-316807 | A | | 11/1992 |
| JP | 06-320536 | A | | 11/1994 |
| JP | 06320536 | A | * | 11/1994 |
| JP | 09-012858 | A | | 1/1997 |
| JP | 2000-218711 | A | | 8/2000 |
| JP | 2003-048991 | A | | 2/2003 |
| JP | 2004-014990 | A | | 1/2004 |

* cited by examiner

*Primary Examiner* — Holly C Rickman
*Assistant Examiner* — Lisa Chau
(74) *Attorney, Agent, or Firm* — DLA Piper LLP (US)

(57) ABSTRACT

A fiber-reinforced multilayered pellet includes a sheath layer and a core layer, the sheath layer being made of a resin composition containing a thermoplastic resin (a1) and a fibrous filler (b1), wherein the fibrous filler (b1) has a weight-average fiber length (Lw) of 0.1 mm to less than 0.5 mm and a weight-average fiber length/number-average fiber length ratio (Lw/Ln) of 1.0 to less than 1.8, the core layer being made of a resin composition containing a thermoplastic resin (a2) and a fibrous filler (b2), wherein the fibrous filler (b2) has a weight-average fiber length (Lw) of 0.5 mm to less than 15.0 mm and a weight-average fiber length/number-average fiber length ratio (Lw/Ln) of 1.8 to less than 5.0.

19 Claims, No Drawings

FIBER-REINFORCED MULTILAYERED PELLET, MOLDED ARTICLE MOLDED THEREFROM, AND METHOD OF PRODUCING FIBER-REINFORCED MULTILAYERED PELLET

TECHNICAL FIELD

This disclosure relates to a fiber-reinforced multilayered pellet, a molded article made of the same, and a method of producing a fiber-reinforced multilayered pellet.

BACKGROUND

It is well known that fibrous fillers such as glass fibers and carbon fibers are blended to improve the mechanical properties of a thermoplastic resin. One commonly used method of blending a fibrous filler is to melt-knead a thermoplastic resin and fiber chopped strands (short fibers) in an extruder.

In recent years, however, there has been an increased demand for higher-performance plastics, and rigidity comparable to those of metals has been demanded. To achieve rigidity comparable to those of metals, it is necessary to incorporate large amounts of fibrous filler while maintaining the fiber length long. Unfortunately, melt-kneading in an extruder, a commonly used method, has many problems such as reduction in flowability, reduction in mechanical properties due to fibrous filler breakage due to shearing during melt-kneading, and degradation of resins due to shear heating due to large amounts of fibrous filler. Melt-kneading a thermoplastic resin and a fibrous filler in a melt-kneader such as an extruder has a limit on the increase in performance.

As a resin composition that provides thin-wall molded articles with excellent appearance properties, mechanical properties, impact resistance, flowability, and moldability, there is proposed a glass-fiber reinforced polycarbonate resin composition made of an aromatic polycarbonate resin, an aromatic polycarbonate oligomer, a glass fiber including short fibers and long fibers, and a compounded-rubber-based graft copolymer (see, for example, JP 09-12858 A).

In addition, there are proposed, for example, a method (what is called "pultrusion") in which continuous carbon fibers are impregnated with a matrix thermoplastic resin, molded, and cooled to produce a longitudinally bundled fiber-reinforced thermoplastic resin (see, for example, JP 04-153007 A), and a method in which a bundle of fibers impregnated with a resin, the fibers being selected from metal fibers, nonmetal fibers coated with metal, and carbon fibers, is formed with a forming nozzle at an outlet of a crosshead die and cut with a pelletizer to a predetermined length to produce a resin-impregnated fiber bundle in the form of pellets (see, for example, JP 2004-14990 A).

Furthermore, as a method of improving mechanical properties by leaving a fiber length long, there are proposed a method in which a long-fiber pellet and a short-fiber pellet are used in combination and a method in which a carbon-fiber chopped strand and a thermoplastic resin pellet are used in combination (see, for example, JP 2000-218711 A).

To multilayer a pellet, there are proposed a method in which a crystalline polyolefin and a flexible olefin copolymer are respectively used as a sheath and a core to reduce adhesion and improve handleability (see, for example, JP 2003-48991 A) and a method in which a multilayered pellet including a resin layer composed mainly of an ethylene/vinyl alcohol copolymer and a resin layer composed mainly of a polyamide is used to improve thermal stability, antiretention properties, hot water resistance, and gas barrier properties (see, for example, JP 2009-242591 A).

The method disclosed in JP '858 improves properties such as flowability and surface appearance through the use of a short glass fiber but, unfortunately, results in poor mechanical properties.

Both of the methods disclosed in JP '007 and JP '990, in which a continuous fiber bundle is coated with a thermoplastic resin while being drawn through a die, have a problem of productivity such that the continuous fiber bundle tends to protrude from the thermoplastic resin coating at a high output rate.

The method disclosed in JP '711 can leave a fiber length long but, unfortunately, results in poor mechanical properties due to low fiber dispersibility.

The multilayered pellets according to the methods disclosed in JP '991 and JP '591 have improved handleability and productivity but, unfortunately, have poor mechanical properties.

It could therefore be helpful to provide a fiber-reinforced multilayered pellet that is excellent in productivity and flowability, provides molded articles with high mechanical properties, and allows for the incorporation of large amounts of fibrous filler.

SUMMARY

We thus provide:

(1) A fiber-reinforced multilayered pellet including a sheath layer and a core layer, the sheath layer being made of a resin composition containing a thermoplastic resin (a1) and a fibrous filler (b1), wherein the fibrous filler has a weight-average fiber length (Lw) of 0.1 mm to less than 0.5 mm and a weight-average fiber length/number-average fiber length ratio (Lw/Ln) of 1.0 to less than 1.8, the core layer being made of a resin composition containing a thermoplastic resin (a2) and a fibrous filler (b2), wherein the fibrous filler (b2) has a weight-average fiber length (Lw) of 0.5 mm to less than 15.0 mm and a weight-average fiber length/number-average fiber length ratio (Lw/Ln) of 1.8 to less than 5.0; or (2) A fiber-reinforced multilayered pellet containing a thermoplastic resin (a3) and a fibrous filler (b3), wherein the fibrous filler at a surface part of the pellet has a weight-average fiber length (Lw) of 0.1 mm to less than 0.5 mm and a weight-average fiber length/number-average fiber length ratio (Lw/Ln) of 1.0 to less than 1.8, and wherein the fibrous filler at a central part of the pellet has a weight-average fiber length (Lw) of 0.5 mm to less than 15.0 mm and a weight-average fiber length/number-average fiber length ratio (Lw/Ln) of 1.8 to less than 5.0.

The molded article has the following structure:

A molded article produced by molding the fiber-reinforced multilayered pellets described above.

The method of producing the fiber-reinforced multilayered pellet has the following structure:

A method of producing the fiber-reinforced multilayered pellet (1), the method including melt-kneading the resin composition constituting the sheath layer and the resin composition constituting the core layer separately, and discharging the resin compositions through a crosshead die to form a multilayer structure.

In the fiber-reinforced multilayered pellet (1), the resin composition constituting the sheath layer preferably contains 40 to 95% by weight of the thermoplastic resin (a1) and 5 to 60% by weight of the fibrous filler (b1).

In the fiber-reinforced multilayered pellet (1), the resin composition constituting the core layer preferably contains 40 to 95% by weight of the thermoplastic resin (a2) and 5 to 60% by weight of the fibrous filler (b2).

In the fiber-reinforced multilayered pellet (1), at least one of the fibrous filler (b1) in the sheath layer and the fibrous filler (b2) in the core layer is preferably at least one selected from the group consisting of glass fibers, polyacrylonitrile-based carbon fibers, pitch-based carbon fibers, and stainless steel fibers.

In the fiber-reinforced multilayered pellet (2), the fibrous filler is preferably at least one selected from the group consisting of glass fibers, polyacrylonitrile-based carbon fibers, pitch-based carbon fibers, and stainless steel fibers.

We provide a fiber-reinforced multilayered pellet having a multilayered configuration in which a resin composition having a specific fiber length distribution is disposed at a core layer or a central part of the pellet, and another resin composition having a specific fiber length distribution is disposed at a sheath layer or a surface part of the pellet, and thus is excellent in productivity and flowability, provides molded articles with high mechanical properties, and allows for the incorporation of large amounts of fibrous filler. Through the use of the fiber-reinforced multilayered pellet, molded articles having excellent mechanical properties can be produced.

DETAILED DESCRIPTION

The fiber-reinforced multilayered pellet will now be described in detail.

A fiber-reinforced multilayered pellet according to a first example includes a sheath layer including a fibrous filler (b1) having a weight-average fiber length (Lw) of 0.1 mm to less than 0.5 mm and a weight-average fiber length/number-average fiber length ratio (Lw/Ln) of 1.0 to less than 1.8, and a core layer including a fibrous filler (b2) having a weight-average fiber length (Lw) of 0.5 mm to less than 15.0 mm and a weight-average fiber length/number-average fiber length ratio (Lw/Ln) of 1.8 to less than 5.0. Sheathing the core layer, which includes a fibrous filler having a long Lw and a high Lw/Ln and has excellent mechanical properties, with the sheath layer, which includes a fibrous filler having a short Lw and a low Lw/Ln and is excellent in flowability and productivity, provides a fiber-reinforced multilayered pellet combining the advantages of the two layers and excellent in flowability, productivity, and mechanical properties of molded articles.

The fiber-reinforced multilayered pellet preferably, but not necessarily, has a cylindrical shape with a diameter of 1 to 7 mm and a pellet length of 3 to 30 mm. A diameter of 1 mm or more facilitates the production of pellets. A diameter of 7 mm or less leads to excellent biting into a molding machine during molding, which allows for stable feeding. A pellet length of 3 mm or more enhances mechanical properties of molded articles. A pellet length of 30 mm or less allows for stable feeding into a molding machine during molding. Based on 100% by weight of the two layers, the core layer preferably constitutes 10% by weight to 90% by weight, and the sheath layer preferably constitutes 10% by weight to 90% by weight. A core layer in an amount of 10% by weight or more and a sheath layer in an amount of 90% by weight or less enhances the mechanical strength of molded articles produced by molding the fiber-reinforced multilayered pellets. The amount of the core layer is more preferably 20% by weight or more, still more preferably 40% by weight or more, and particularly preferably 60% by weight or more. The amount of the sheath layer is more preferably 80% by weight or less, still more preferably 60% by weight or less, and particularly preferably 40% by weight or less. A core layer in an amount of 90% by weight or less and a sheath layer in an amount of 10% by weight or more enhances the productivity of the fiber-reinforced multilayered pellets. The amount of the core layer is more preferably 87.5% by weight or less, still more preferably 85% by weight or less, and particularly preferably 80% by weight or less. The amount of the sheath layer is more preferably 12.5% by weight or more, still more preferably 15% by weight or more, and particularly preferably 20% by weight or more. The fiber-reinforced multilayered pellet may include two or more core layers or two or more sheath layers. When two or more core layers or two or more sheath layers are included, it is preferred that the total weight of the core layers or the sheath layers be in the above range.

The sheath layer will now be described. The sheath layer is made of a resin composition containing a thermoplastic resin (a1) and a fibrous filler (b1), wherein the fibrous filler has a weight-average fiber length (Lw) of 0.1 mm to less than 0.5 mm and a weight-average fiber length/number-average fiber length ratio (Lw/Ln) of 1.0 to less than 1.8. In other words, the fibrous filler in the sheath layer of the fiber-reinforced multilayered pellet has a weight-average fiber length (Lw) of 0.1 mm to less than 0.5 mm and a weight-average fiber length/number-average fiber length ratio (Lw/Ln) of 1.0 to less than 1.8.

In the fiber-reinforced multilayered pellet, the thermoplastic resin (a1), used for the resin composition constituting the sheath layer, may be any resin having thermoplasticity. Examples include styrene resins, olefin resins, thermoplastic elastomers, polyamides, polyesters, polycarbonates, polyarylene sulfides, cellulose derivatives, fluoro resins, polyoxymethylenes, polyimides, polyamide-imides, polyvinyl chlorides, polyacrylates, polyphenylene ethers, polyethersulfones, polyetherimides, polyether ketones, polyether ether ketones, liquid-crystalline resins, and modifications thereof. These may be contained in combination of two or more thereof.

Examples of styrene resins include polystyrenes (PS), high-impact polystyrenes (HIPS), acrylonitrile/styrene copolymers (AS), acrylonitrile/ethylene•propylene•unconjugated diene rubber/styrene copolymers (AES), acrylonitrile/butadiene/styrene copolymers (ABS), and methyl methacrylate/butadiene/styrene copolymers (MBS). Throughout this specification, "/" denotes a copolymer. These resins may be contained in combination of two or more thereof. Among these resins, ABS is particularly preferred.

Examples of olefin resins include polypropylenes, polyethylenes, ethylene/propylene copolymers, ethylene/1-butene copolymers, ethylene/propylene/unconjugated diene copolymers, ethylene/ethyl acrylate copolymers, ethylene/glycidyl methacrylate copolymers, ethylene/vinyl acetate/glycidyl methacrylate copolymers, ethylene/propylene-g-maleic anhydride copolymers, and methacrylic acid/methyl methacrylate/glutaric anhydride copolymers. These may be contained in combination of two or more thereof. Among these resins, polypropylenes are particularly preferred to enhance flowability and mechanical strength of molded articles.

Examples of polypropylenes include homopolymers obtained by homopolymerization of propylene, random copolymers obtained by copolymerization of propylene and ethylene or any other monomer, and block copolymers obtained by blending polypropylene with polyethylene or ethylene/propylene rubber, which are all suitable for use. The configuration of polypropylenes is not limited and may be atactic (a random configuration), syndiotactic (a configuration in which substituents are located alternately in a regular manner), or isotactic (a configuration in which substituents are located regularly on the same side).

For the molecular weight of olefin resins, melt flow rate (MFR) is used as an index. The MFR, as measured in accordance with ISO1133 at 230° C. under a load of 2.16 kg, is preferably 0.1 to 200 g/10 min. An MFR of not less than 0.1 g/10 min enhances the mechanical strength of molded articles. The MFR is more preferably not less than 0.5 g/10 min, still more preferably not less than 1 g/10 min. An MFR of not more than 200 g/10 min enhances productivity. The MFR is more preferably not more than 100 g/10 min, still more preferably not more than 50 g/10 min. In the case of polypropylenes, an intrinsic viscosity, as measured in a decahydronaphthalene or tetrahydronaphthalene solvent, can also be used as a basic index.

Examples of thermoplastic elastomers include polyester-polyether elastomers, polyester-polyester elastomers, thermoplastic polyurethane elastomers, thermoplastic styrene-butadiene elastomers, thermoplastic olefin elastomers, and thermoplastic polyamide elastomers. These may be contained in combination of two or more thereof.

Any polyamides may be used that are obtained by reactions such as ring-opening polymerization of a lactam, condensation polymerization of a diamine and a dicarboxylic acid, and condensation polymerization of an amino carboxylic acid and have amide bonds in their repeating structures. Examples of lactams include ε-caprolactam, enantholactam, and ω-laurolactam. Examples of diamines include aliphatic diamines such as tetramethylenediamine, hexamethylenediamine, undecamethylenediamine, dodecamethylenediamine, tridecamethylenediamine, 1,9-nonanediamine, 1,10-decanediamine, 2-methyl-1,8-octanediamine, 2,2,4-trimethylhexamethylenediamine, 2,4,4-trimethylhexamethylenediamine, and 5-methylnonamethylenediamine; alicyclic diamines such as 1,3-bisaminomethylcyclohexane and 1,4-bisaminomethylcyclohexane; and aromatic diamines such as m-phenylenediamine, p-phenylenediamine, m-xylylenediamine, and p-xylylenediamine. Examples of dicarboxylic acids include aliphatic dicarboxylic acids such as adipic acid, suberic acid, azelaic acid, sebacic acid, dimer acid, dodecanedioic acid, and 1,1,3-tridecanedioic acid; alicyclic dicarboxylic acids such as 1,3-cyclohexanedicarboxylic acid; and aromatic dicarboxylic acids such as terephthalic acid, isophthalic acid, and naphthalenedicarboxylic acid. Examples of amino carboxylic acids include ε-aminocaproic acid, 7-aminoheptanoic acid, 8-aminooctanoic acid, 9-aminononanoic acid, 11-aminoundecanoic acid, 12-aminododecanoic acid, and 13-aminotridecanoic acid.

Specific examples polyamides include nylon 6, nylon 46, nylon 66, nylon 11, nylon 12, nylon 610, nylon 612, nylon 6/66, nylon 6/612, nylon MXD (m-xylylenediamine) 6, nylon 9T, nylon 10T, nylon 6T/66, nylon 6T/6I, nylon 6T/M5T, nylon 6T/12, nylon 66/6T/6I, and nylon 6T/6. These may be contained in combination of two or more thereof. Among these polyamides, nylon 6, nylon 66, nylon 610, and nylon 9T are preferred.

Although the degree of polymerization of a polyamide is not limited, the relative viscosity, as measured at 25° C. in a 98% concentrated sulfuric acid solution at a resin concentration of 0.01 g/ml, is preferably 1.5 to 7.0. A relative viscosity of 1.5 or more increases the sheathing properties in processing into multilayered pellets, leading not only to enhanced productivity but also to enhanced mechanical strength of molded articles produced by molding the fiber-reinforced multilayered pellets. The relative viscosity is more preferably 2.0 or more, still more preferably 2.2 or more. A relative viscosity of 7.0 or less reduces the breakage of a fibrous filler in processing into multilayered pellets, leading not only to enhanced mechanical properties, e.g., rigidity and strength but also to enhanced production stability. The relative viscosity is more preferably 5.0 or less, still more preferably 3.0 or less.

Preferred polyesters are polymers and copolymers each including, as a main structural unit, a residue of a dicarboxylic acid or an ester-forming derivative thereof and a diol or an ester-forming derivative thereof. In particular, aromatic polyester resins such as polyethylene terephthalate, polypropylene terephthalate, polybutylene terephthalate, polycyclohexanedimethylene terephthalate, polyethylene naphthalate, polypropylene naphthalate, polybutylene naphthalate, polyethylene isophthalate/terephthalate, polypropylene isophthalate/terephthalate, polybutylene isophthalate/terephthalate, polyethylene terephthalate/naphthalate, polypropylene terephthalate/naphthalate, and polybutylene terephthalate/naphthalate are preferred, and polybutylene terephthalate is most preferred. These resins may be contained in combination of two or more thereof. In these polyesters, the proportion of terephthalic acid residues in all the dicarboxylic acid residues is preferably 30 mol % or more, more preferably 40 mol % or more.

A polyester may contain at least one residue selected from hydroxycarboxylic acids, ester-forming derivatives thereof, and lactones. Examples of hydroxycarboxylic acids include glycolic acid, lactic acid, hydroxypropionic acid, hydroxybutyric acid, hydroxyvaleric acid, hydroxycaproic acid, hydroxybenzoic acid, p-hydroxybenzoic acid, and 6-hydroxy-2-naphthoic acid. Examples of lactones include caprolactone, valerolactone, propiolactone, and undecalactone, and 1,5-oxepan-2-one. Examples of polymers and copolymers containing a structural unit of such a residue include aliphatic polyester resins such as polyglycolic acid, polylactic acid, poly(glycolic acid/lactic acid), and poly(hydroxybutyric acid/β-hydroxybutyric acid/β-hydroxyvaleric acid). These may be contained in combination of two or more thereof.

The melting point of a polyester is preferably, but not necessarily, 120° C. or higher, more preferably 220° C. or higher, in terms of heat resistance. The upper limit is preferably, but not necessarily, 300° C. or lower, more preferably 280° C. or lower. The melting point of a polyester is determined by differential scanning calorimetry (DSC) at a temperature rise rate of 20° C./min. The amount of terminal carboxyl group in a polyester is preferably, but not necessarily, 50 eq/t or less, more preferably 10 eq/t or less, in terms of flowability, hydrolysis resistance, and heat resistance. The lower limit is 0 eq/t. The amount of terminal carboxyl group in a polyester resin is determined by dissolution in an o-cresol/chloroform solvent, followed by titration with ethanolic potassium hydroxide.

Although the viscosity of a polyester is not limited as long as melt-kneading can be carried out, the intrinsic viscosity, as measured at 25° C. using an o-chlorophenol solution, is preferably 0.36 to 1.60 dl/g in terms of moldability. An intrinsic viscosity of 0.36 dl/g or more increases the sheathing properties in processing into multilayered pellets, leading not only to enhanced productivity but also to enhanced mechanical strength of molded articles produced by molding the fiber-reinforced multilayered pellets. The intrinsic viscosity is more preferably 0.50 dl/g or more, still more preferably 0.70 dl/g or more. An intrinsic viscosity of 1.60 dl/g or less reduces the breakage of a fibrous filler in processing into multilayered pellets, leading not only to enhanced mechanical properties, e.g., rigidity and strength but also to enhanced production stability. The intrinsic viscosity is more preferably 1.25 dl/g or less, still more preferably 1.0 dl/g or less. The weight average molecular weight (Mw) of a polyester resin is preferably, but not necessarily, 50,000 to 500,000, more preferably 150,000 to 250,000, in terms of heat resistance. The molecular weight of a polyester is determined by gel permeation chromatography (GPC).

Polyesters may be produced by any known method such as condensation polymerization or ring-opening polymerization. The polymerization may be batch polymerization or continuous polymerization, and both transesterification reaction and reaction by direct polymerization may be used.

Polycarbonates can be produced by the phosgene method in which phosgene is bubbled into a bifunctional phenolic compound in the presence of a caustic alkali and a solvent, transesterification in which a bifunctional phenolic compound and diethyl carbonate are transesterified in the presence of a catalyst, and other methods. Examples of polycarbonates include aromatic homopolycarbonates and aromatic copolycarbonates. Such an aromatic polycarbonate preferably has a viscosity average molecular weight of 10,000 or more, more preferably 15,000 or more. To reduce the breakage of fibrous fillers and improve production stability, the upper limit is preferably 100,000 or less, more preferably 50,000 or less. Examples of bifunctional phenolic compounds include 2,2'-bis(4-hydroxyphenyl)propane, 2,2'-bis(4-hydroxy-3,5-dimethylphenyl)propane, bis(4-hydroxyphenyl)methane, 1,1'-bis(4-hydroxyphenyl)ethane, 2,2'-bis(4-hydroxyphenyl)butane, 2,2'-bis(4-hydroxy-3,5-diphenyl)butane, 2,2'-bis(4-hydroxy-3,5-dipropylphenyl)propane, 1,1'-bis(4-hydroxyphenyl)cyclohexane, and 1-phenyl-1,1'-bis(4-hydroxyphenyl)ethane. These may be contained in combination of two or more thereof.

Examples of polyarylene sulfides include polyphenylene sulfides (PPS), polyphenylene sulfide sulfones, polyphenylene sulfide ketones, and random copolymers and block copolymers thereof. These may be contained in combination of two or more thereof. Among them, polyphenylene sulfides are particularly suitable for use.

Polyarylene sulfides can be produced by generally known methods such as the method described in JP 45-3368 B, by which a polymer with a relatively small molecular weight is produced, and the methods described in JP 52-12240 B and JP 61-7332 A, by which a polymer with a relatively large molecular weight is produced. The polyarylene sulfide produced may, of course, be subjected to various treatments before use such as crosslinking/increase in molecular weight by heating; heat-treatments in an atmosphere of an inert gas such as nitrogen, or under reduced pressure; washing with, for example, organic solvents, hot water, and aqueous acid solutions; and activation by functional group-containing compounds such as acid anhydrides, amines, isocyanates, and functional group-containing disulfide compounds. One specific example of the method of subjecting a polyarylene sulfide to crosslinking/increase in molecular weight by heating is to heat the polyarylene sulfide in an atmosphere of an oxidizing gas such as air or oxygen, or an atmosphere of a mixed gas of the oxidizing gas and an inert gas such as nitrogen and argon, until the desired melt viscosity is achieved at a predetermined temperature in a heating vessel. The heat-treatment is preferably carried out at 200 to 270° C. for 2 to 50 hours. To heat-treat the polyarylene sulfide more uniformly with efficiency, the polyarylene sulfide is preferably heated in a rotary heating vessel or a heating vessel equipped with a stirring blade. One specific example of the method of heat-treating a polyarylene sulfide in an atmosphere of an inert gas such as nitrogen, or under reduced pressure is to heat-treat the polyarylene sulfide at 200° C. to 270° C. for 2 to 50 hours in an atmosphere of an inert gas such as nitrogen, or under reduced pressure (preferably 7,000 $Nm^{-2}$ or lower). The heat-treatment may be carried out using an ordinary hot-air dryer, a rotary heater or a heater equipped with a stirring blade. To heat-treat the polyarylene sulfide more uniformly with efficiency, the polyarylene sulfide is more preferably heated in a rotary heating vessel or a heating vessel equipped with a stirring blade. When a polyarylene sulfide is washed with an organic solvent, organic solvents such as N-methylpyrrolidone, acetone, dimethylformamide, and chloroform are suitable for use. Washing with an organic solvent is carried out, for example, by immersing the polyarylene sulfide resin in an organic solvent, and the polyarylene sulfide resin may optionally be stirred or heated as appropriate. The washing is preferably carried out at normal temperature to 150° C. The polyarylene sulfide resin that has been subjected to washing with an organic solvent is preferably washed with water or warm water for several times to remove residual organic solvent. When a polyarylene sulfide is treated with hot water, the water for use is preferably distilled water or deionized water. The operation of the hot water treatment is typically carried out by placing a predetermined amount of polyarylene sulfide in a predetermined amount of water and heating and stirring the mixture at normal pressure or in a pressure vessel. The polyarylene sulfide resin and water are preferably used in a bath ratio of 200 g or less of polyarylene sulfide to 1 liter of water. One specific example of the method of subjecting a polyarylene sulfide to acid treatment is to immerse the polyarylene sulfide resin in an acid or aqueous acid solution, and the polyarylene sulfide resin may optionally be stirred or heated as appropriate. Acids suitable for use are acetic acid and hydrochloric acid. The polyarylene sulfide that has been subjected to acid treatment is preferably washed with water or warm water for several times to remove residual acid or salts. The water used for washing is preferably distilled water or deionized water.

The melt viscosity of a polyarylene sulfide, as measured at 310° C. and a shear rate of 1,000/sec, is preferably 80 Pa·s or less, more preferably 20 Pa·s or less. The lower limit is preferably, but not necessarily, at least 5 Pa·s. Two or more polyarylene sulfides having different melt viscosities may be contained in combination of two or more thereof. The melt viscosity can be determined using a Capilograph apparatus (Toyo Seiki Co., Ltd.) at a die length of 10 mm and a die hole diameter of 0.5 to 1.0 mm.

Examples of cellulose derivatives include cellulose acetate, cellulose acetate butyrate, and ethylcellulose. These may be contained in combination of two or more thereof.

Among the thermoplastic resins described above, polyamides, styrene resins, olefin resins, polycarbonates, and polyarylene sulfides are preferred. These thermoplastic resins have high affinity for fibrous fillers and thus have high moldability, providing molded articles with enhanced mechanical properties and surface appearance. In particular, nylon 6, nylon 66, nylon 610, nylon 9T, acrylonitrile/butadiene/styrene copolymers (ABS), polypropylenes, polycarbonates, and polyphenylene sulfides are more suitable for use.

In the fiber-reinforced multilayered pellet, the fibrous filler (b1), used for the resin composition constituting the sheath layer, may be any filler having a fibrous shape. Incorporation of a fibrous filler provides molded articles having high dimensional stability as well as high mechanical properties such as strength and rigidity. Specific examples include glass fibers; polyacrylonitrile-based (PAN-based) and pitch-based carbon fibers; metal fibers such as stainless steel fibers, aluminum fibers, and brass fibers; organic fibers such as aromatic polyamide fibers; gypsum fibers; ceramic fibers; asbestos fibers; zirconia fibers; alumina fibers; silica fibers; titanium oxide fibers; silicon carbide fibers; rock wool; fibrous whisker fillers such as potassium titanate whiskers, silicon nitride whiskers, wollastonite, and alumina silicate; and nonmetal fibers (e.g., glass fibers, aramid fibers, polyester fibers, and carbon fibers) coated with metals (e.g., nickel, copper, cobalt, silver, aluminum, iron, and alloys thereof). These may be contained in combination of two or more thereof. Among the above fillers for use as the fibrous filler (b1), glass fibers, PAN-based and pitch-based carbon fibers, and stainless steel fibers are more preferred in terms of the balance between the mechanical properties such as strength and rigidity of molded articles and flowability, and PAN-based carbon fibers are still more preferred. PAN-based carbon fibers are suitable for use because they are highly effective in improving mechanical properties and less likely to break during melt-kneading.

To improve the wettability of resin and the ease of handling, coupling agents, sizing agents, and other agents may be applied to the surface of the fibrous filler (b1). Examples of coupling agents include amino-functional, epoxy-functional, chloro-functional, mercapto-functional, and cationic silane coupling agents, and amino-functional silane coupling agents are suitable for use. Examples of sizing agents include sizing agents containing a maleic anhydride compound, a urethane compound, an acrylic compound, an epoxy compound, a phenolic compound, and/or a derivative of these compounds, and sizing agents containing a urethane compound are suitable for use. The amount of sizing agent in the fibrous filler (b1) is preferably 0.1 to 10.0% by weight, more preferably 0.3 to 8.0% by weight, and particularly preferably 0.5 to 6.0% by weight.

The fiber-reinforced multilayered pellet is characterized in that the fibrous filler (b1), which is in the resin composition constituting the sheath layer, has a weight-average fiber length (Lw) of 0.1 mm to less than 0.5 mm and a weight-average fiber length/number-average fiber length ratio (Lw/Ln:dispersity) of 1.0 to less than 1.8. An Lw below 0.1 mm of the fibrous filler (b1) in the sheath layer results in reduced mechanical properties, in particular, flexural modulus, of molded articles produced from the fiber-reinforced multilayered pellet. The Lw of the fibrous filler (b1) is preferably 0.125 mm or mores, more preferably 0.15 mm or more. An Lw not less than 0.5 mm of the fibrous filler (b1) in the sheath layer results in poor surface appearance of the fiber-reinforced multilayered pellet and low productivity. The Lw of the fibrous filler (b1) is more preferably less than 0.45 mm, still more preferably less than 0.40 mm. An Lw/Ln (dispersity) below 1.0 of the fibrous filler (b1) in the sheath layer results in reduced mechanical properties, in particular, flexural modulus, of molded articles produced from the fiber-reinforced multilayered pellet. The Lw/Ln of the fibrous filler (b1) is preferably 1.05 or more, still more preferably 1.1 or more. An Lw/Ln (dispersity) not less than 1.8 of the fibrous filler (b1) in the sheath layer results in poor surface appearance of the fiber-reinforced multilayered pellet and low productivity. The Lw/Ln of the fibrous filler (b1) is preferably less than 1.7, more preferably less than 1.6.

The weight-average fiber length (Lw) and the number-average fiber length (Ln) of the fibrous filler (b1) in the resin composition can be determined, for example, as described below. In producing the fiber-reinforced multilayered pellet, the sheath layer alone is fed without feeding the core layer to sample the sheath layer. Alternatively, the peripheral surface of the fiber-reinforced multilayered pellet can be cut to sample the sheath layer. When the sheath layer and the core layer are distinguishable from each other, it is preferable to cut the peripheral sheath layer alone for sampling. When the layers are difficult to distinguish from each other, sampling is carried out with the peripheral surface defined as a part within 10% by weight from the outermost layer of the fiber-reinforced multilayered pellet. The sample is dissolved in a solvent capable of dissolving thermoplastic resins, filtered through filter paper, and then washed. The residue on the filter paper, the fibrous filler, is observed using a light microscope at a magnification of 50×. The lengths of 1,000 fibers are measured. From the measurements (mm) (two significant figures after the decimal point), the weight-average fiber length (Lw), the number-average fiber length (Ln), and the dispersity (Lw/Ln) are calculated.

$$\text{Number-average fiber length } (Ln)=\Sigma(Li\times ni)/\Sigma ni$$

$$\text{Weight-average fiber length } (Lw)=\Sigma(Wi\times Li)/\Sigma Wi=\Sigma(\pi ri^2\times Li\times\Sigma\times ni\times Li)/\Sigma(\pi ri^2\times Li\times\rho\times ni)$$

When the fiber diameter ri and the density ρ are constant, the above equation is simplified to the following equation:

$$\text{Weight-average fiber length } (Lw)=\rho(Li^2\times ni)/\Sigma(Li\times ni)$$

Li: Fiber length of fibrous filler
ni: Number of fibers with length of Li
Wi: Weight of fibrous filler
ri: Fiber diameter of fibrous filler
ρ: Density of fibrous filler.

The fibrous filler (b1) may be in any form that can be added into a melt-kneader such as pre-cut chopped strands, fractured fibers, and continuous fibers. Chopped strands are suitable for use in terms of productivity.

The fiber length distribution of the fibrous filler (b1) in the sheath layer can be controlled within the above range, for example, by using, as a raw material, a fibrous filler having any fiber length distribution selected to achieve the desired fiber length distribution, by controlling the shear applied to the fibrous filler through the control of the melt viscosity of a thermoplastic resin used, or by controlling the screw rotation speed, the cylinder temperature, and the discharge rate during the melt-kneading of the resin composition described below.

In the resin composition constituting the sheath layer, the amount of thermoplastic resin (a1) is preferably 40% by weight to 95% by weight, and the amount of fibrous filler (b1) is preferably 5% by weight to 60% by weight. Not less than 40% by weight of the thermoplastic resin (a1) and not more than 60% by weight of the fibrous filler (b1) leads to enhanced moldability and surface appearance of the fiber-reinforced multilayered pellet. The amount of thermoplastic resin (a1) is more preferably 45% by weight or more, still more preferably 50% by weight or more. The amount of fibrous filler (b1) is more preferably 55% by weight or less, still more preferably 50% by weight or less. Not more than 95% by weight of the thermoplastic resin (a1) and not less than 5% by weight of the fibrous filler (b1) enhances the mechanical properties, in particular, flexural modulus, of molded articles produced from the fiber-reinforced multilayered pellet. The amount of thermoplastic resin (a1) is more preferably 90% by weight or less, still more preferably 85% by weight or less. The amount of fibrous filler (b1) is more preferably 10% by weight or more, still more preferably 15% by weight or more.

The resin composition constituting the sheath layer may further contain any optional components. For example, when a polyamide is used as the thermoplastic resin (a1), it is preferable to use copper compounds as additives to improve long-term heat resistance. Preferred copper compounds are monohalogenated copper compounds, and a non-limiting example is cuprous iodide. The amount of copper compound added is preferably 0.015 to 1 part by weight based on 100 parts by weight of the polyamide. To prevent or reduce coloring of molded articles due to the release of metallic copper during molding, alkali halides may be added together with copper compounds. Examples of suitable alkali halide compounds include potassium iodide and sodium iodide.

Non-fibrous fillers may be used in combination with the fibrous filler (b1). Any non-fibrous fillers such as plate, powder, and granular fillers, can be used. Specific examples include silicates such as talc, zeolite, sericite, mica, kaolin, clay, pyrophyllite, and bentonite; metal compounds such as magnesium oxide, alumina, zirconium oxide, and iron oxide; carbonates such as calcium carbonate, magnesium carbonate, and dolomite; sulfates such as calcium sulfate and barium sulfate; glass beads; ceramic beads; boron nitride; calcium phosphate; hydroxides such as calcium hydroxide, magnesium hydroxide, and aluminum hydroxide; non-fibrous fillers such as glass flakes, glass powder, glass balloon, carbon black, silica, and graphite; and layered silicates including smectite clay minerals such as montmorillonite, beidellite, nontronite, saponite, hectorite, and sauconite, various clay minerals such as vermiculite, halloysite, kanemite, kenyaite, zirconium phosphate, and titanium phosphate, and swelling micas such as Li-fluortaeniolite, Na-fluortaeniolite, Na-tetrasilicic fluormica, and Li-tetrasilicic fluormica. These may be contained in combination of two or more thereof. In layered silicates, interlayer exchangeable cations may be exchanged for organic onium ions. Examples of organic onium ions include ammonium ion, phosphonium ion, and sulfonium ion. The non-fibrous fillers are preferably treated with silane coupling agents, titanate coupling agents, and any other surface treatment agents, and more preferably treated with epoxy silane coupling agents and amino silane coupling agents. Among the non-fibrous fillers, glass flakes and glass beads are more suitable for use. The amount of non-fibrous filler is 0.01 to 20% by weight, preferably 0.02 to 15% by weight, and more preferably 0.05 to 10% by weight, based on 100% by weight of the resin composition. Not less than 0.01% by weight of non-fibrous fillers provides molded articles with enhanced mechanical properties. Not more than 20% by weight of non-fibrous fillers provides fiber-reinforced multilayered pellets with enhanced surface appearance and moldability.

To the extent that the desired effects are not adversely affected, customary additives may be added such as plasticizers such as hindered phenolic compounds, phosphite compounds, polyalkylene oxide oligomer compounds, thioether compounds, ester compounds, and organophosphorus compounds; crystal nucleating agents such as talc, kaolin, organophosphorus compounds, and polyether ether ketone; releasing agents such as polyolefin compounds, silicone compounds, long-chain aliphatic ester compounds, and long-chain aliphatic amide compounds; corrosion inhibitors; color protecting agents; antioxidants; thermal stabilizers; lubricants such as lithium stearate and aluminum stearate; flame retardants; ultraviolet inhibitors; coloring agents; and blowing agents.

The core layer will now be described. The core layer is made of a resin composition containing a thermoplastic resin (a2) and a fibrous filler (b2), wherein the fibrous filler has a weight-average fiber length (Lw) of 0.5 mm to less than 15.0 mm and a weight-average fiber length/number-average fiber length ratio (Lw/Ln) of 1.8 to less than 5.0. In other words, the fibrous filler in the core layer of the fiber-reinforced multilayered pellet has a weight-average fiber length (Lw) of 0.5 mm to less than 15.0 mm and a weight-average fiber length/number-average fiber length ratio (Lw/Ln) of 1.8 to less than 5.0.

In the fiber-reinforced multilayered pellet, the thermoplastic resin (a2), used for the resin composition constituting the core layer, may be any resin having thermoplasticity. For example, the resins listed as examples of the thermoplastic resin (a1), used for the resin composition constituting the sheath layer, may be used.

Preferred examples of the thermoplastic resin (a2) include polyamides, styrene resins, olefin resins, polycarbonates, and polyarylene sulfides. In particular, nylon 6, nylon 66, nylon 610, nylon 9T, acrylonitrile/butadiene/styrene copolymers (ABS), polypropylenes, polycarbonates, and polyphenylene sulfides are suitable for use.

In the fiber-reinforced multilayered pellet, the fibrous filler (b2), used for the resin composition constituting the core layer, may be any filler having a fibrous shape. Specifically, fillers listed as examples of the fibrous filler (b1), used for the resin composition constituting the sheath layer, may be used. PAN-based carbon fibers are particularly suitable for use as the fibrous filler (b2). PAN-based carbon fibers are suitable for use because they are highly effective in improving mechanical properties and less likely to break during melt-kneading.

To improve the wettability of resin and the ease of handling, coupling agents, sizing agents, and other agents may be applied to the surface of the fibrous filler (b2). Coupling agents and sizing agents previously listed as coupling agents and sizing agents applied to (b1) may be used. The amount of sizing agent in the fibrous filler (b2) is preferably 0.1 to 10.0% by weight, more preferably 0.3 to 8.0% by weight, and particularly preferably 0.5 to 6.0% by weight.

The fiber-reinforced multilayered pellet is characterized in that the fibrous filler (b2), which is in the resin composition constituting the core layer, has a weight-average fiber length (Lw) in the range of 0.5 mm to less than 15.0 mm and a weight-average fiber length/number-average fiber length ratio (Lw/Ln:dispersity) in the range of 1.8 to less than 5.0. An Lw below 0.5 mm of the fibrous filler (b2) in the core layer results in reduced mechanical properties, in particular, impact strength, of molded articles produced from the fiber-reinforced multilayered pellet. The Lw of the fibrous filler (b2) is preferably 0.55 mm or more, more preferably 0.6 mm or more. An Lw not less than 15.0 mm of the fibrous filler (b2) in the core layer results in poor pellet surface appearance of the fiber-reinforced multilayered pellet. The Lw of the fibrous filler (b2) is preferably 10.0 mm or less, more preferably 6.0 mm or less. An Lw/Ln (dispersity) below 1.8 of the fibrous filler (b2) in the core layer results in reduced mechanical properties, in particular, impact strength, of molded articles produced from the fiber-reinforced multilayered pellet. The Lw/Ln of the fibrous filler (b2) is preferably 1.9 or more, more preferably 2.0 or more. An Lw/Ln (dispersity) not less than 5.0 of the fibrous filler (b2) in the core layer results in poor surface appearance of the fiber-reinforced multilayered pellet. The Lw/Ln of the fibrous filler (b2) is preferably 4.5 or less, more preferably 4.0 or less.

The weight-average fiber length (Lw) and the number-average fiber length (Ln) of the fibrous filler (b2) in the resin composition can be determined, for example, as described below. In producing the fiber-reinforced multilayered pellet, the core layer alone is fed without feeding the sheath layer to sample the core layer. Alternatively, the core layer can be sampled by cutting the fiber-reinforced multilayered pellet in half along the longitudinal direction and cutting out the central part along the longitudinal direction. When the sheath layer and the core layer are distinguishable from each other, it is preferable to cut the core layer alone at the central part for sampling. When the layers are difficult to distinguish from each other, sampling is carried out with the central part defined as a part within 10% by weight from the center of the fiber-reinforced multilayered pellet. The sample is dissolved in a solvent capable of dissolving thermoplastic resins, filtered through filter paper, and then washed. The residue on the filter paper, the fibrous filler, is observed using a light microscope at a magnification of 50×. The lengths of 1,000 fibers are measured. From the measurements (mm) (two significant figures after the decimal point), the weight-average fiber length (Lw), the number-average fiber length (Ln), and the dispersity (Lw/Ln) are calculated.

$$\text{Number-average fiber length } (Ln)=\Sigma(Li\times ni)/\Sigma ni$$

$$\text{Weight-average fiber length } (Lw)=\Sigma(Wi\times Li)/\Sigma Wi=\Sigma(\pi ri^2\times Li\times\rho\times ni\times Li)/\Sigma(\pi ri^2\times Li\times\rho\times ni)$$

When the fiber diameter ri and the density ρ are constant, the above equation is simplified to the following equation:

$$\text{Weight-average fiber length } (Lw)=\Sigma(Li^2\times ni)/\Sigma(Li\times ni)$$

Li: Fiber length of fibrous filler
ni: Number of fibers with length of Li
Wi: Weight of fibrous filler
ri: Fiber diameter of fibrous filler
ρ: Density of fibrous filler.

The fibrous filler (b2) may be in any form that can be added into a melt-kneader such as pre-cut chopped strands, fractured fibers, and continuous fibers. Chopped strands are suitable for use in terms of productivity.

The fiber length distribution of the fibrous filler (b2) in the core layer can be controlled within the above range, for example, by using, as a raw material, a fibrous filler having any fiber length distribution selected to achieve the desired fiber length distribution, controlling the shear applied to the fibrous filler through the control of the melt viscosity of a thermoplastic resin used, or controlling the screw rotation speed, the cylinder temperature, and the discharge rate during the melt-kneading of the resin composition described below.

The resin composition constituting the core layer may further contain any optional components. Optional components listed as examples of the optional components in the resin composition constituting the sheath layer may be used.

In the resin composition constituting the core layer, the amount of thermoplastic resin (a2) is preferably 40% by weight to 95% by weight, and the amount of fibrous filler (b2) is preferably 5% by weight to 60% by weight. Not less than 40% by weight of the thermoplastic resin (a2) and not more than 60% by weight of the fibrous filler (b2) leads to enhanced moldability and surface appearance of the fiber-reinforced multilayered pellet. The amount of thermoplastic resin (a2) is more preferably 45% by weight or more, still more preferably 50% by weight or more. The amount of fibrous filler (b2) is more preferably 55% by weight or less, still more preferably 50% by weight or less. Not more than 95% by weight of the thermoplastic resin (a2) and not less than 5% by weight of the fibrous filler (b2) enhances the mechanical properties, in particular, flexural modulus, of molded articles produced from the fiber-reinforced multilayered pellet. The amount of thermoplastic resin (a2) is more preferably 90% by weight or less, still more preferably 85% by weight or less. The amount of fibrous filler (b2) is more preferably 10% by weight or more, still more preferably 15% by weight or more.

The fiber-reinforced multilayered pellet also includes, in addition to the above-described two-layered pellet made up of the sheath layer and the core layer, a fiber-reinforced multilayered pellet containing a thermoplastic resin (a3) and a fibrous filler (b3), wherein the fibrous filler at a surface part of the pellet has a weight-average fiber length (Lw) of 0.1 mm to less than 0.5 mm and a weight-average fiber length/number-average fiber length ratio (Lw/Ln) of 1.0 to less than 1.8, and wherein the fibrous filler at a central part of the pellet has a weight-average fiber length (Lw) of 0.5 mm to less than 15.0 mm and a weight-average fiber length/number-average fiber length ratio (Lw/Ln) of 1.8 to less than 5.0. Similarly to the two-layered pellet made up of the sheath layer and the core layer, the fiber-reinforced multilayered pellet containing a thermoplastic resin (a3) and a fibrous filler (b3) has excellent mechanical properties, which are due to containing a fibrous filler having a long Lw and a high Lw/Ln at the central part of the pellet, and flowability and productivity, which are due to containing a fibrous filler having a short Lw and a low Lw/Ln at the surface part of the pellet.

The thermoplastic resin (a3) used for the fiber-reinforced multilayered pellet may be any resin having thermoplasticity. For example, the resins listed as examples of the thermos-plastic resin (a1), used for the resin composition constituting the sheath layer, may be used.

Preferred examples of the thermoplastic resin (a3) include polyamides, styrene resins, olefin resins, polycarbonates, and polyarylene sulfides. In particular, nylon 6, nylon 66, nylon 610, nylon 9T, acrylonitrile/butadiene/styrene copolymers (ABS), polypropylenes, polycarbonates, and polyphenylene sulfides are suitable for use.

The fibrous filler (b3) used for the fiber-reinforced multilayered pellet may be any filler having a fibrous shape. Specifically, fillers listed as examples of the fibrous filler (b1) used for the resin composition constituting the sheath layer may be used. PAN-based carbon fibers are particularly suitable for use as the fibrous filler (b3). PAN-based carbon fibers are suitable for use because they are highly effective in improving mechanical properties and less likely to break during melt-kneading.

To improve the wettability of resin and the ease of handling, coupling agents, sizing agents, and other agents may be applied to the surface of the fibrous filler (b3). Coupling agents and sizing agents previously listed as coupling agents and sizing agents applied to (b1) may be used. The amount of sizing agent in the fibrous filler (b3) is preferably 0.1 to 10.0% by weight, more preferably 0.3 to 8.0% by weight, and particularly preferably 0.5 to 6.0% by weight.

In the fiber-reinforced multilayered pellet, the weight-average fiber length (Lw) and the weight-average fiber length/number-average fiber length ratio (Lw/Ln) of the fibrous filler at a surface part and a central part are values measured at parts within 10% by weight respectively from the outermost layer and the center of the pellet.

The fiber-reinforced multilayered pellet is characterized in that the fibrous filler (b3) at a surface part of the pellet has a weight-average fiber length (Lw) of 0.1 mm to less than 0.5 mm and a weight-average fiber length/number-average fiber length ratio (Lw/Ln) of 1.0 to less than 1.8.

An Lw below 0.1 mm of the fibrous filler (b3) at a surface part of the pellet results in reduced mechanical properties, in particular, flexural modulus, of molded articles produced from the fiber-reinforced multilayered pellet. The Lw of the fibrous filler (b3) is preferably 0.125 mm or more, more preferably 0.15 mm or more. An Lw not less than 0.5 mm of the fibrous filler (b3) at a surface part of the pellet results in poor surface appearance of the fiber-reinforced multilayered pellet and low productivity. The Lw of the fibrous filler (b3) is more preferably less than 0.45 mm, still more preferably less than 0.40 mm. An Lw/Ln (dispersity) below 1.0 of the fibrous filler (b3) at a surface part of the pellet results in reduced mechanical properties, in particular, flexural modulus, of molded articles produced from the fiber-reinforced multilayered pellet. The Lw/Ln of the fibrous filler (b3) is preferably 1.05 or more, still more preferably 1.1 or more. An Lw/Ln (dispersity) not less than 1.8 of the fibrous filler (b3) at a surface part of the pellet results in poor surface appearance of the fiber-reinforced multilayered pellet and low productivity. The Lw/Ln of the fibrous filler (b3) is preferably less than 1.7, more preferably less than 1.6.

The fiber-reinforced multilayered pellet is characterized in that the fibrous filler (b3) at a central part of the pellet has a weight-average fiber length (Lw) in the range of 0.5 mm to less than 15.0 mm and a weight-average fiber length/number-average fiber length ratio (Lw/Ln) in the range of 1.8 to less than 5.0.

An Lw below 0.5 mm of the fibrous filler (b3) at a central part of the pellet results in reduced mechanical properties, in particular, impact strength, of molded articles produced from the fiber-reinforced multilayered pellet. The Lw of the fibrous filler (b3) is preferably 0.55 mm or more, more preferably 0.6 mm or more. An Lw not less than 15.0 mm of the fibrous filler (b3) at a central part of the pellet results in poor pellet surface appearance of the fiber-reinforced multilayered pellet. The Lw of the fibrous filler (b3) is preferably 10.0 mm or less, still more preferably 6.0 mm or less. An Lw/Ln (dispersity) below 1.8 of the fibrous filler (b3) at a central part of the pellet results in reduced mechanical properties, in particular, impact strength, of molded articles produced from the fiber-reinforced multilayered pellet. The Lw/Ln of the fibrous filler (b3) is preferably 1.9 or more, still more preferably 2.0 or more. An Lw/Ln (dispersity) not less than 5.0 of the fibrous filler (b3) at a central part of the pellet results in poor surface appearance of the fiber-reinforced multilayered pellet. The Lw/Ln of the fibrous filler (b3) is preferably 4.5 or less, more preferably 4.0 or less.

The weight-average fiber length (Lw) and the number-average fiber length (Ln) of the fibrous filler (b3) in the resin composition can be determined, for example, as described below. For example, the fiber-reinforced multilayered pellet produced is cut in half along the longitudinal direction, and parts within 10% by weight respectively from a surface part and a central part are cut out to prepare samples. The samples are each dissolved in a solvent capable of dissolving thermoplastic resins, filtered through filter paper, and then washed. The residue on the filter paper, the fibrous filler, is observed using a light microscope at a magnification of 50×. The lengths of 1,000 fibers are measured. From the measurements (mm) (two significant figures after the decimal point), the weight-average fiber length (Lw), the number-average fiber length (Ln), and the dispersity (Lw/Ln) are calculated. The same equations as for the fibrous filler (b1) are used.

The fibrous filler (b3) may be in any form that can be added into a melt-kneader such as pre-cut chopped strands, fractured fibers, and continuous fibers. These may be contained in combination of two or more thereof. Chopped strands are suitable for use in terms of productivity.

In the fiber-reinforced multilayered pellet, the fiber length distribution of the fibrous filler (b3) can be controlled within the above range, for example, by using, as a raw material, a fibrous filler having any fiber length distribution selected to achieve the desired fiber length distribution, using a fibrous filler having a different elastic modulus to control the breakage due to shearing, or controlling the screw rotation speed, the cylinder temperature, and the discharge rate during the melt-kneading of the resin composition described below.

In the fiber-reinforced multilayered pellet, the amount of thermoplastic resin (a3) is preferably 40% by weight to 95% by weight, and the amount of fibrous filler (b3) is preferably 5% by weight to 60% by weight. Not less than 40% by weight of the thermoplastic resin (a3) and not more than 60% by weight of the fibrous filler (b3) leads to enhanced moldability and surface appearance of the fiber-reinforced multilayered pellet. The amount of thermoplastic resin (a3) is more preferably 45% by weight or more, still more preferably 50% by weight or more. The amount of fibrous filler (b3) is more preferably 55% by weight or less, still more preferably 50% by weight or less. Not more than 95% by weight of the thermoplastic resin (a3) and not less than 5% by weight of the fibrous filler (b3) enhances the mechanical properties, in particular, flexural modulus, of molded articles produced from the fiber-reinforced multilayered pellet. The amount of thermoplastic resin (a3) is more preferably 90% by weight or less, still more preferably 85% by weight or less. The amount of fibrous filler (b3) is more preferably 10% by weight or more, still more preferably 15% by weight or more.

A method of producing the fiber-reinforced multilayered pellet will now be described. Examples of the method include a method in which the resin composition constituting the sheath layer and the resin composition constituting the core layer described above are separately melt kneaded and discharged through a crosshead die to form a multilayer structure; a method in which a fibrous filler having any desired fiber length distribution to achieve the desired fiber length distribution is used as a raw material and melt kneaded; and a method in which the screw rotation speed, the cylinder temperature, and the discharge rate during the melt-kneading of the resin composition are controlled. In particular, the method in which the resin compositions are discharged through a crosshead die to form a multilayer structure is preferred because of convenience and no restriction on thermoplastic resins and fibrous fillers to be used. A method of producing a fiber-reinforced multilayered pellet including a sheath layer and a core layer using a crosshead die will be described below.

For the resin composition constituting the sheath layer, it is preferable to melt-kneading the thermoplastic resin (a1), the fibrous filler (b1), and optional other components (e.g., non-fibrous fillers) using a melt-kneader. The temperature of the melt-kneader is preferably set at the melting point (Tm) of the thermoplastic resin used+at least 30° C. or the glass transition point (Tg) of the thermoplastic resin+at least 120° C. The thermoplastic resin (a1) and the fibrous filler (b1) may be fed into the melt-kneader at any point. In a twin-screw extruder, the thermoplastic resin (a1) is preferably fed from a main raw material feed port. The fibrous filler (b1) is preferably fed midway between the main raw material feed port and a discharge port, specifically, at the intermediate position between a seal zone or mixing zone nearest to the main raw material feed port and a seal zone or mixing zone nearest to the discharge port in a screw element design. Feeding at this position allows the weight-average fiber length to be easily controlled.

The melt-kneader may be any melt-kneader capable of hot-melt kneading the thermoplastic resin (a1), the fibrous filler (b1), and optional other components in a moderate shear field such as known extruders and continuous kneaders used for resin processing. Examples include single-screw extruders/kneaders equipped with one screw, twin-screw extruders/kneaders equipped with two screws, multi-screw extruders/kneaders equipped with three or more screws, tandem extruders in which two extruders/kneaders are connected, and extruders/kneaders provided with a side feeder configured only to feed raw materials and not to perform melt-kneading. For a screw element design, any combination of a melt- or non-melt-conveying zone having, for example, a full-flight screw, a seal zone having, for example, a seal ring, and a mixing zone having, for example, a Unimelt or a kneading may be used. Preferred are continuous melt-kneaders having two or more seal zones and/or mixing zones and two or more raw material feed ports. More preferred are continuous melt-kneaders having two or more seal zones and/or mixing zones and two or more raw material feed ports and having a twin screw. Most preferred are twin-screw extruders having two or more seal zones and/or mixing zones and two or more raw material feed ports. When the resin composition contains a non-fibrous filler, the non-fibrous filler is preferably fed into a melt-kneader together with the fibrous filler.

For the resin composition constituting the core layer, it is preferable to melt-mix the thermoplastic resin (b2), the fibrous filler (b2), and optional other components (e.g., non-fibrous fillers) using a melt-kneader. The temperature of the melt-kneader is preferably set at the melting point (Tm) of the thermoplastic resin (b2) used+at least 30° C. or the glass transition point (Tg) of the thermoplastic resin (b2)+at least 120° C. The thermoplastic resin (a2) and the fibrous filler (b2) may be fed into the melt-kneader at any point. In a single-screw extruder, the thermoplastic resin (a2) and the fibrous filler (b2) are preferably fed from a main raw material feed port.

The melt-kneader may be any melt-kneader capable of hot-melt mixing the thermoplastic resin (a2), the fibrous filler (b2), and optional other components in a low shear field such as known extruders and continuous kneaders used for resin processing. Examples include single-screw extruders/kneaders equipped with one screw, twin-screw extruders/kneaders equipped with two screws, multi-screw extruders/kneaders equipped with three or more screws, tandem extruders in which two extruders/kneaders are connected, and extruders/kneaders provided with a side feeder configured only to feed raw materials and not to perform melt-kneading. For a screw element design, any combination of a melt- or non-melt-conveying zone having, for example, a full-flight screw, a seal zone having, for example, a seal ring, and a mixing zone having, for example, a Unimelt or a kneading may be used. Preferred are continuous melt-kneaders having a full-flight screw and no seal zone or mixing zone. When the resin composition contains a non-fibrous filler, the non-fibrous filler is preferably fed into a melt-kneader together with the fibrous filler.

Next, the resin compositions constituting each layer that have been melt mix kneaded are, for example, fed to one crosshead die and discharged, whereby the fiber-reinforced multilayered pellet can be produced. According to this production method, a fiber-reinforced pellet with large amounts of fibrous filler incorporated can be produced with high productivity. Specifically, the fiber-reinforced multilayered pellet is produced as described below. A thermoplastic resin (a1) and a fibrous filler (b1) are melt kneaded in a melt-kneader to provide a resin composition (A), the fibrous filler (b1) having a controlled weight-average fiber length (Lw) of 0.1 mm to less than 0.5 mm and a controlled weight-average fiber length/number-average fiber length ratio (Lw/Ln) of 1.0 to less than 1.8, and the resin composition (A) is fed to a crosshead die to form a sheath layer. A thermoplastic resin (a2) and a fibrous filler (b2) are melt kneaded in a melt-kneader to provide a resin composition (B), the fibrous filler (b2) having a controlled weight-average fiber length (Lw) of 0.5 mm to less than 15.0 mm and a controlled weight-average fiber length/number-average fiber length ratio (Lw/Ln) of 1.8 to less than 5.0, and the resin composition (B) is fed to the crosshead die to form a core layer.

The fiber-reinforced multilayered pellet thus produced is excellent in productivity, flowability, and surface appearance, and furthermore, provides molded articles with high mechanical properties.

The fiber-reinforced multilayered pellet can be processed, for example, into molded articles having excellent surface appearance (gloss) and high mechanical properties by a standard molding method such as injection molding, extrusion molding, or press molding. Having such advantageous properties, the fiber-reinforced multilayered pellet is suitable for injection-molded articles such as automotive parts, electrical and electronic components, and sports equipment parts, in particular, for example, molded articles having thin-walled portions 0.1 to 2.0 mm in thickness and molded articles requiring dimensional accuracy.

The molded articles can be used in various applications such as automotive parts, electric and electronic parts, building components, sports equipment parts, various containers, daily necessities, everyday sundries, and sanitary goods. Specific examples of the application include under-hood parts for automobiles such as air flow meters, air pumps, thermostat housings, engine mounts, ignition bobbins, ignition cases, clutch bobbins, sensor housings, idle speed control valves, vacuum switching valves, ECU housings, vacuum pump cases, inhibitor switches, rotation sensors, acceleration sensors, distributor caps, coil bases, ABS actuator cases, the top and the bottom of radiator tanks, cooling fans, fan shrouds, engine covers, cylinder head covers, oil caps, oil pans, oil filters, fuel caps, fuel strainers, distributor caps, vapor canister housings, air cleaner housings, timing belt covers, brake booster parts, various cases, various tubes, various tanks, various hoses, various clips, various valves, and various pipes; interior parts for automobiles such as torque control levers, safety belt parts, register blades, washer levers, window regulator handles, knobs for window regulator handles, passing light levers, sun visor brackets, and various motor housings; exterior parts for automobiles such as roof rails, fenders, garnishes, bumpers, door mirror stays, spoilers, hood louvers, wheel covers, wheel caps, grill apron cover frames, lamp reflectors, lamp bezels, and door handles; and electrical and electronic components such as relay cases, coil bobbins, optical pickup chassis, motor cases, housings, chassis, and internal parts for notebook computers, housings and internal parts for CRT displays, housings and internal parts for printers, housings, chassis, and internal parts for mobile terminals including mobile phones, mobile computers, and handheld-type mobiles, housings, chassis, and internal parts for recording media (e.g., CD, DVD, PD, and FDD) drives, housings, chassis, and internal parts for copiers, housings, chassis, and internal parts for facsimile devices, and parabolic antennas. Other examples include parts for home and office electric appliances such as VTR parts, television parts, irons, hair dryers, rice cooker parts, microwave oven parts, acoustic parts, parts for video equipment including video cameras and projectors, substrates for optical recording media including Laser Disc (registered trademark), compact disc (CD), CD-ROM, CD-R, CD-RW, DVD-ROM, DVD-R, DVD-RW, DVD-RAM, and Blu-ray disc, parts and housings for illumination, chassis parts, refrigerator parts, air conditioner parts, typewriter parts, and word processor parts. The molded articles are also useful for housings, chassis, and internal parts for electronic musical instruments, home game consoles, and portable game consoles; electrical and electronic components such as various gears, various cases, sensors, LEP lamps, connectors, sockets, resistors, relay cases, switches, coil bobbins, capacitors, variable capacitor cases, optical pickups, radiators, various terminal blocks, transformers, plugs, printed circuit boards, tuners, speakers, microphones, headphones, small motors, magnetic head bases, power modules, semiconductors, liquid crystals, FDD carriages, FDD chassis, motor brush holders, transformer members, and coil bobbins; building components such as sash rollers, blind curtain parts, pipe joints, curtain liners, blind parts, gas meter parts, water meter parts, water heater parts, roof panels, adiabatic walls, adjusters, plastic floor posts, ceiling hangers, stairs, doors, and floors; civil engineering-related members such as concrete molds; sports equipment parts such as fishing rod parts, housings and chassis parts for reels, lure parts, cooler box parts, golf club parts, racket parts for tennis, badminton, and squash, ski parts, ski pole parts, bicycles parts such as frames, pedals, front forks, handlebars, cranks, sheet pillars, and wheels, oars for boats, helmets for sports, fence components, golf tees, and face protectors and bamboo swords for Kendo (Japanese art of fencing); machine parts such as gears, screws, springs, bearings, levers, key stems, cams, ratchets, rollers, water-supply parts, toy parts, banding bands, clips, fans, pipes, washing jigs, motor parts, microscopes, binoculars, cameras, and watches; agricultural members such as pots for raising seedlings, vegetation piles, and stoppers for agricultural vinyl sheets; medical supplies such as fracture reinforcing materials; vessels and tableware such as trays, blisters, knives, forks, spoons, tubes, plastic cans, pouches, containers, tanks, and baskets; containers such as hot-fill containers, containers for microwave oven cooking, and containers for cosmetics; IC trays; stationery; drain filters, bags; chairs; tables; cooler boxes; rakes; hose reels; planters; hose nozzles; surfaces of dining tables and desks; furniture panels; kitchen cabinets; pen caps; and gas lighters. In particular, the molded articles are useful for interior parts for automobiles, exterior parts for automobiles, sports equipment parts, and housings, chassis, and internal parts for various electric and electronic components.

The fiber-reinforced resin pellet and the molded article are recyclable. For example, the fiber-reinforced resin pellet or the molded article produced therefrom is pulverized, preferably, into powder and then optionally blended with additives for reuse, but when fiber breakage has occurred, it is difficult for the resin composition reproduced to exhibit a mechanical strength comparable to that of the molded article.

EXAMPLES

Our pellets, molded articles and methods will now be described in more detail with reference to examples and comparative examples, but these examples are not intended to limit this disclosure. All parts and wt % in the examples are parts by weight and % by weight.

Thermoplastic Resin (a1) Thermoplastic Resin of Sheath Layer (a1-1) A nylon 6 resin (relative viscosity, as measured at 25° C. in a 98% concentrated sulfuric acid solution at a resin concentration of 0.01 g/ml:2.35) was used.

(a1-2) A nylon 6 resin (relative viscosity, as measured at 25° C. in a 98% concentrated sulfuric acid solution at a resin concentration of 0.01 g/ml:3.40) was used.

(a1-3) A "TARFLON" (registered trademark) A1900 polycarbonate resin (Idemitsu Kosan Co., Ltd.) was used.

(a2) Thermoplastic Resin of Core Layer (a2-1) The same nylon 6 resin as in (a1-1) was used.

(a2-2) The same polycarbonate resin as in (a1-3) was used.

Fibrous Filler (b1) Fibrous Filler of Sheath Layer (b1-1) A "TORAYCA" (registered trademark) cut fiber TV14-006 carbon fiber (a chopped strand with a fiber length of 6 mm) (Toray Industries, Inc., yarn: T700SC-12K, tensile strength: 4.90 GPa, tensile elastic modulus: 230 GPa, fiber diameter: 6.8 μm) was used.

(b2) Fibrous Filler of Core Layer (b2-1) The same carbon fiber as in (b1-1) was used.

Carbon-Fiber Reinforced Pellet (c1) A "TORAYCA" (registered trademark) long-fiber pellet TLP1060 carbon-fiber reinforced nylon 6 resin (carbon fiber content: 30 wt %, Toray Industries, Inc.) (long-fiber reinforced pellet) was used.

(c2) A carbon-fiber reinforced nylon 6 resin (a short-fiber reinforced pellet) obtained in Comparative Example 1 in Table 1 was used.

Examples 1 to 5, Comparative Examples 1 to 5

At a composition ratio of a sheath layer resin composition (A) shown in Table 1, a thermoplastic resin (a1) was fed via a main hopper into a twin-screw extruder for sheath layer (TEX30α available from The Japan Steel Works, Ltd.) set to conditions shown in the Table, and then a fibrous filler (b1) was fed into the molten resin using a side feeder and melt kneaded. The mixture was fed to a crosshead die to form a core-sheath structure. At a composition ratio of a core layer resin composition (B) shown in Table 1, a thermoplastic resin (a2) and a fibrous filler (b2) were fed via a main hopper into a single-screw extruder for core layer (diameter: 40 mm, L/D: 30) set to conditions shown in the Table and melt kneaded. The mixture was fed to the crosshead die to form a core-sheath structure. A multilayered strand having a diameter of 4 mm discharged from the die was quenched in water and cut with a strand cutter into pellets with a length of 3.0 mm to obtain a fiber-reinforced multilayered pellet. The constituent ratio of core layer/sheath layer was controlled by the discharge rate of the core layer and the sheath layer from the melt-kneaders. In Comparative Examples 1 and 2, no core layer resin composition (B) was used, and in Comparative Example 3, no sheath layer resin composition (A) was used. The pellets of Comparative Examples 1 to 3 are therefore not multilayered pellets.

The fiber-reinforced multilayered pellets obtained above were each vacuum dried at 80° C. for 24 hours and molded into test specimens using an injection molding machine (SG75H-MIV available from Sumitomo Heavy Industries, Ltd.) under conditions shown in Table 1 at an injection speed of 50 mm/sec and an injection pressure of a lower limit pressure+1 MPa. Physical properties were determined under the following conditions.

Fiber Length

A resin composition for sheath layer and a resin composition for core layer were respectively melt kneaded in a twin-screw extruder for sheath layer and a single-screw extruder for core layer under the same extrusion conditions as in Examples and Comparative Examples, and a strand discharged from a crosshead die was sampled. In Examples 1 to 5 and Comparative Examples 4 to 5, a fiber-reinforced multilayered pellet discharged from a crosshead die was cut in half along the longitudinal direction, and parts within 10% by weight respectively from the outermost layer and the center were cut out to sample a sheath layer and a core layer. The samples obtained were each dissolved with formic acid, washed, and then filtered. The residue was observed under a light microscope at a magnification of 50× to measure the length of 1,000 randomly selected fibers. From the measurements, the weight-average fiber length (Lw), the number-average fiber length (Ln), and the dispersity (Lw/Ln) were calculated by the following equations:

$$\text{Number-average fiber length } (Ln)=\Sigma(Li\times ni)/\Sigma ni$$

$$\text{Weight-average fiber length } (Lw)=\Sigma(Li^2\times ni)/\Sigma(Li\times ni)$$

Li: Fiber length of fibrous filler ni: Number of fibers with length of Li.

Productivity (Continuous Take-Off Properties)

A strand was discharged from a crosshead die at a rate of 10 kg/hr for 30 minutes, and the number of breaks of the strand was counted.

Impact Resistance

Test specimens of ISO3167 Type B were evaluated for Charpy impact strength (notched) in accordance with ISO179 at 23° C. The average of measurements of 12 test specimens was used.

Tensile Strength

Test specimens of ISO3167 Type A were evaluated for tensile strength in accordance with ISO527 at 23° C. The average of measurements of six test specimens was used.

Flexural Strength, Flexural Modulus

Test specimens of ISO3167 Type A were evaluated for flexural strength and flexural modulus in accordance with ISO178 at 23° C. For both the flexural strength and the flexural modulus, the average of measurements of six test specimens was used.

Spiral Flow Length

Using a mold of 10 mm (width)×2 mmt, flow lengths were measured during moldings under temperature conditions shown in tables at an injection speed of 50 mm/sec and an injection pressure of 80 MPa. The average of 20 shots was used.

Appearance Evaluation

Using a square-plate mold of 80 mm×80 mm×3 mm (thickness), molding was performed under temperature conditions shown in tables at an injection speed 50 mm/sec and an injection pressure of a lower limit pressure+1 MPa. The number of fibrous filler aggregates on the surface of the molded article was visually counted. The average of 10 square plates was used as the number of aggregates.

Comparative Example 6

As shown in Table 1, the long-fiber reinforced pellet (c1) alone was fed to an injection molding machine. Test specimens were molded under the same conditions as in Examples 1 to 5 and Comparative Examples 1 to 5, and their physical properties were determined.

Comparative Example 7

As shown in Table 1, a dry-blended pellet of the long-fiber reinforced pellet (c1) and the short-fiber reinforced pellet (c2) in a composition ratio of 50 parts by weight to 50 parts by weight was fed to an injection molding machine. Test specimens were molded under the same conditions as in Examples 1 to 5 and Comparative Examples 1 to 5, and their physical properties were determined.

Comparative Example 8

As shown in Table 1, the nylon 6 resin (a1-1) and the carbon-fiber chopped strand (b1-1) were dry blended in a composition ratio of 70 parts by weight to 30 parts by weight and fed to an injection molding machine. Test specimens were molded under the same conditions as in Examples 1 to 5 and Comparative Examples 1 to 5, and their physical properties were determined.

The evaluation results of Examples 1 to 5 and Comparative Examples 1 to 8 are shown in Table 1.

TABLE 1

| | | | Example 1 | Example 2 | Example 3 | Example 4 | Example 5 | Comparative Example 1 | Comparative Example 2 |
|---|---|---|---|---|---|---|---|---|---|
| Sheath layer resin composition (A) | Thermoplastic resin (a1) | Parts by weight | (a1-1) 70 | (a1-1) 70 | (a1-1) 70 | (a1-1) 70 | (a1-1) 55 | (a1-1) 70 | (a1-1) 55 |
| | Fibrous filler (b1) | Parts by weight | (b1-1) 30 | (b1-1) 30 | (b1-1) 30 | (b1-1) 30 | (b1-1) 45 | (b1-1) 30 | (b1-1) 45 |
| Sheath layer extruding conditions | Extruding temperature | ° C. | 260 | 260 | 260 | 260 | 260 | 260 | 260 |
| | Screw rotation speed | | 200 | 200 | 200 | 200 | 200 | 200 | 200 |
| | Discharge rate | kg/hr | 7.5 | 7.5 | 5 | 3 | 7.5 | 7.5 | 7.5 |
| | Remarks | | Biaxial mixing 2 locations | Biaxial mixing 2 locations | Biaxial mixing 2 locations | Biaxial mixing 2 locations | Biaxial mixing 2 locations | Biaxial mixing 2 locations | Biaxial mixing 2 locations |
| Sheath layer fiber length | Weight average fiber length (Lw) | mm | 0.40 | 0.40 | 0.35 | 0.31 | 0.28 | 0.40 | 0.28 |

TABLE 1-continued

| | | | | | | | | | |
|---|---|---|---|---|---|---|---|---|---|
| (strand) | Number average fiber length (Ln) | mm | 0.34 | 0.34 | 0.27 | 0.23 | 0.20 | 0.34 | 0.20 |
| | Dispersity (Lw/Ln) | | 1.18 | 1.18 | 1.30 | 1.35 | 1.40 | 1.18 | 1.40 |
| Core layer resin composition (B) | Thermoplastic resin (a2) | Parts by weight | (a2-1) 70 | (a2-1) 70 | (a2-1) 70 | (a2-1) 70 | (a2-1) 55 | — | — |
| | Fibrous filler (b2) | Parts by weight | (b2-1) 30 | (b2-1) 30 | (b2-1) 30 | (b2-1) 30 | (b2-1) 45 | — | — |
| Core layer extruding conditions | Extruding temperature | ° C. | 260 | 260 | 260 | 260 | 260 | — | — |
| | Screw rotation speed | | 50 | 25 | 25 | 25 | 25 | — | — |
| | Discharge rate | kg/hr | 7.5 | 7.5 | 10.0 | 12.0 | 7.5 | — | — |
| | Remarks | | Uniaxial full flight | Uniaxial full flight | Uniaxial full flight | Uniaxial full flight | Uniaxial full flight | — | — |
| Core layer fiber length (strand) | Weight average fiber length (Lw) | mm | 1.15 | 2.02 | 2.17 | 2.32 | 1.34 | — | — |
| | Number average fiber length (Ln) | mm | 0.44 | 0.81 | 0.92 | 1.03 | 0.63 | — | — |
| | Dispersity (Lw/Ln) | | 2.61 | 2.49 | 2.36 | 2.25 | 2.13 | — | — |
| Sheath layer fiber length (multi layer pellet) | Weight average fiber length (Lw) | mm | 0.39 | 0.39 | 0.35 | 0.31 | 0.28 | — | — |
| | Number average fiber length (Ln) | mm | 0.34 | 0.34 | 0.27 | 0.23 | 0.20 | — | — |
| | Dispersity (Lw/Ln) | | 1.15 | 1.15 | 1.30 | 1.35 | 1.40 | — | — |
| Core layer fiber length (multi layer pellet) | Weight average fiber length (Lw) | mm | 1.14 | 2.01 | 2.14 | 2.29 | 1.33 | — | — |
| | Number average fiber length (Ln) | mm | 0.43 | 0.81 | 0.92 | 1.02 | 0.62 | — | — |
| | Dispersity (Lw/Ln) | | 2.65 | 2.48 | 2.33 | 2.25 | 2.15 | — | — |
| Injection molding conditions | Molding temperature | ° C. | 280 | 280 | 280 | 280 | 280 | 280 | 280 |
| | Mold temperature | ° C. | 80 | 80 | 80 | 80 | 80 | 80 | 80 |
| Productibility | Strand breaking frequency | Counts | 0 | 0 | 0 | 0 | 0 | 0 | 0 |
| | Remarks | | | | | | | | |
| Properties | Impact resistance (Notched) | $kJ/m^2$ | 15 | 17 | 18 | 19 | 18 | 11 | 10 |
| | Tensile strength | MPa | 260 | 265 | 265 | 265 | 230 | 260 | 230 |
| | Flexural strength | MPa | 360 | 360 | 360 | 365 | 380 | 355 | 375 |
| | Flexural modulus | Gpa | 20.7 | 21.0 | 21.2 | 20.9 | 31.6 | 20.1 | 30.8 |
| | Spiral flow length | mm | 435 | 430 | 430 | 425 | 300 | 440 | 310 |
| | Appearance | Number | 0 | 0 | 0 | 0 | 0 | 0 | 0 |

| | | Comparative Example 3 | Comparative Example 4 | Comparative Example 5 | Comparative Example 6 | Comparative Example 7 | Comparative Example 8 |
|---|---|---|---|---|---|---|---|
| Sheath layer resin composition (A) | Thermoplastic resin (a1) | — | (a1-1) 70 | (a1-1) 70 | (c1) 100 | (c1)50 (c2) 50 Pellets blend | (a1-1)70 (b1-1)30 Blend by molding machine |
| | Fibrous filler (b1) | — | (b1-1) 30 | (b1-1) 30 | | | |
| Sheath layer extruding conditions | Extruding temperature | — | 260 | 260 | | | |
| | Screw rotation speed | — | 50 | 200 | | | |
| | Discharge rate | — | 7.5 | 7.5 | | | |
| | Remarks | — | Biaxial mixing 2 locations | Biaxial mixing 2 locations | | | |
| Sheath layer fiber length (strand) | Weight average fiber length (Lw) | — | 0.60 | 0.40 | | | |
| | Number average fiber length (Ln) | — | 0.36 | 0.34 | | | |
| | Dispersity (Lw/Ln) | — | 1.67 | 1.18 | | | |
| Core layer resin composition (B) | Thermoplastic resin (a2) | (a2-1) 70 | (a2-1) 70 | (a2-1) 70 | | | |
| | Fibrous filler (b2) | (b2-1) 30 | (b2-1) 30 | (b2-1) 30 | | | |
| Core layer extruding conditions | Extruding temperature | 260 | 260 | 260 | | | |
| | Screw rotation speed | 50 | 25 | 200 | | | |
| | Discharge rate | 7.5 | 7.5 | 7.5 | | | |
| | Remarks | Uniaxial full flight | Uniaxial full flight | Uniaxial full flight | | | |
| Core layer fiber length (strand) | Weight average fiber length (Lw) | 1.16 | 2.02 | 0.64 | | | |
| | Number average fiber length (Ln) | 0.45 | 0.81 | 0.38 | | | |
| | Dispersity (Lw/Ln) | 2.58 | 2.49 | 1.68 | | | |
| Sheath layer fiber length (multi layer pellet) | Weight average fiber length (Lw) | — | 0.59 | 0.39 | | | |
| | Number average fiber length (Ln) | — | 0.35 | 0.34 | | | |
| | Dispersity (Lw/Ln) | — | 1.69 | 1.15 | | | |

TABLE 1-continued

| | | | | | | | |
|---|---|---|---|---|---|---|---|
| Core layer fiber length (multi layer pellet) | Weight average fiber length (Lw) | — | 2.01 | 0.62 | | | |
| | Number average fiber length (Ln) | — | 0.82 | 0.37 | | | |
| | Dispersity (Lw/Ln) | — | 2.45 | 1.68 | | | |
| Injection molding conditions | Molding temperature | 280 | 280 | 280 | 280 | 280 | 280 |
| | Mold temperature | 80 | 80 | 80 | 80 | 80 | 80 |
| Productibility | Strand breaking frequency | Impossible to take up | 52 | 0 | — | — | — |
| | Remarks | Fluff generated | Fluff generated | | — | — | — |
| Properties | Impact resistance (Notched) | — | 19 | 12 | 23 | 19 | 18 |
| | Tensile strength | — | 250 | 265 | 290 | 270 | 190 |
| | Flexural strength | — | 350 | 360 | 390 | 360 | 320 |
| | Flexural modulus | — | 21.1 | 21.0 | 20.3 | 20.7 | 21.0 |
| | Spiral flow length | — | 390 | 435 | 325 | 375 | 300 |
| | Appearance | — | 8 | 0 | 9 | 6 | >15 |

Examples 1 to 5 and Comparative Examples 1 to 8 show that fiber-reinforced multilayered pellets including a sheath layer resin composition (A) containing a thermoplastic resin (a1) and a fibrous filler (b1) having a weight-average fiber length (Lw) of 0.1 mm to less than 0.5 mm and a weight-average fiber length/number-average fiber length ratio (Lw/Ln) of 1 to less than 1.8, and a core layer resin composition (B) containing a thermoplastic resin (a2) and a fibrous filler (b2) having a weight-average fiber length (Lw) of 0.5 mm to less than 15.0 mm and a weight-average fiber length/number-average fiber length ratio (Lw/Ln) of 1.8 to less than 5.0 exhibit high productivity, significantly improved impact resistance, high flowability, and excellent appearance despite the incorporation of large amounts of fibrous filler.

Specifically, a sheath layer composition alone, as in Comparative Examples 1 and 2, provides high productivity but no improved mechanical properties, in particular, low impact strength. A core layer composition alone, as in Comparative Example 3, results in a strand that is swollen by fluffing and cannot be drawn, leading to failure to pelletization or low productivity. A pellet including a sheath layer having a fiber length of not less than 0.5 mm, as in Comparative Example 4, provides excellent mechanical properties, but results in a strand that is swollen by fluffing and frequently broken, leading to low productivity. A pellet including a core layer having a weight-average fiber length/number-average fiber length ratio (Lw/Ln) of less than 1.8, as in Comparative Example 5, exhibits high productivity, but no improved mechanical properties, in particular, low impact strength, similarly to Comparative Example 1. A long-fiber reinforced pellet alone made of carbon fibers wire-coated with a nylon 6 resin, as in Comparative Example 6, and a blending of a long-fiber reinforced pellet and a short-fiber reinforced pellet, as in Comparative Example 7, exhibit excellent mechanical properties, but low flowability and, furthermore, low fibrous filler dispersibility, resulting in a molded article with poor appearance. A pellet obtained by kneading a dry blending of a thermoplastic resin and a fibrous filler directly in a molding machine, as in Comparative Example 8, exhibits reduced mechanical properties, flowability, and appearance.

Examples 6 to 11, Comparative Examples 9 to 12

At a composition ratio of a sheath layer resin composition (A) shown in Table 2, a thermoplastic resin (a1) was fed via a main hopper into a twin-screw extruder for sheath layer (TEX30α available from The Japan Steel Works, Ltd.) set to conditions shown in the table, and then a fibrous filler (b1) was fed into the molten resin using a side feeder and melt kneaded. The mixture was fed to a crosshead die to form a core-sheath structure. At a composition ratio of a core layer resin composition (B) shown in Table 2, a thermoplastic resin (a2) and a fibrous filler (b2) were fed via a main hopper into a twin-screw extruder for core layer (TEX30α available from The Japan Steel Works, Ltd., L/D35) set to conditions shown in the table and melt kneaded. The mixture was fed to the crosshead die to form a core-sheath structure. A multilayered strand having a diameter of 4 mm discharged from the die was quenched in water and cut with a strand cutter into pellets with a length of 3.0 mm to obtain a fiber-reinforced multilayered pellet. The constituent ratio of core layer/sheath layer was controlled by the discharge rate of the core layer and the sheath layer from the melt-kneaders. In Comparative Examples 9 and 12, no sheath layer resin composition (A) was used and, in Comparative Example 11, no core layer resin composition (B) was used. The pellets of Comparative Examples 9, 11, and 12 are therefore not multilayered pellets.

Among the fiber-reinforced multilayered pellets obtained above, those obtained using a nylon 6 resin as a thermoplastic resin were vacuum dried at 80° C. for 24 hours, and those obtained using a polycarbonate resin as a thermoplastic resin were hot-air dried at 120° C. for at least 5 hours. The dried pellets were each molded into test specimens using an injection molding machine (SG75H-MIV available from Sumitomo Heavy Industries, Ltd.) under conditions shown in Table 2 at an injection speed of 50 mm/sec and an injection pressure of a lower limit pressure+1 MPa. Physical properties were determined in the same manner as in Examples 1 to 5 and Comparative Examples 1 to 8. The evaluation results are shown in Table 2.

TABLE 2

| | | | Example 6 | Example 7 | Example 8 | Example 9 | Example 10 |
|---|---|---|---|---|---|---|---|
| Sheath layer resin composition (A) | Thermoplastic resin (a1) | Parts by weight | (a1-1) 70 | (a1-1) 70 | (a1-1) 55 | (a1-2) 70 | (a1-3) 70 |
| | Fibrous filler (b1) | Parts by weight | (b1-1) 30 | (b1-1) 30 | (b1-1) 45 | (b1-1) 30 | (b1-1) 30 |
| Sheath layer extruding conditions | Extruding temperature | ° C. | 260 | 260 | 260 | 260 | 280 |
| | Screw rotation speed | | 200 | 200 | 200 | 200 | 200 |
| | Discharge rate | kg/hr | 7.5 | 3 | 7.5 | 7.5 | 7.5 |
| | Remarks | | Biaxial mixing 2 locations | Biaxial mixing 2 locations | Biaxial mixing 2 locations | Biaxial mixing 2 locations | Biaxial mixing 2 locations |
| Sheath layer fiber length (strand) | Weight average fiber length (Lw) | mm | 0.40 | 0.31 | 0.27 | 0.36 | 0.30 |
| | Number average fiber length (Ln) | mm | 0.34 | 0.24 | 0.20 | 0.27 | 0.23 |
| | Dispersity (Lw/Ln) | | 1.18 | 1.29 | 1.35 | 1.33 | 1.30 |
| Core layer resin composition (B) | Thermoplastic resin (a2) | Parts by weight | (a2-1) 70 | (a2-1) 70 | (a2-1) 55 | (a2-1) 70 | (a2-2) 70 |
| | Fibrous filler (b2) | Parts by weight | (b2-1) 30 | (b2-1) 30 | (b2-1) 45 | (b2-1) 30 | (b2-1) 30 |
| Core layer extruding conditions | Extruding temperature | ° C. | 280 | 280 | 280 | 280 | 310 |
| | Screw rotation speed | | 40 | 40 | 40 | 40 | 40 |
| | Discharge rate | kg/hr | 7.5 | 12 | 7.5 | 7.5 | 7.5 |
| | Remarks | | Biaxial mixing 1 location | Biaxial mixing 1 location | Biaxial mixing 1 location | Biaxial mixing 1 location | Biaxial mixing 1 location |
| Core layer fiber length (strand) | weight average fiber length (Lw) | mm | 1.89 | 2.21 | 1.28 | 1.89 | 0.64 |
| | Number average fiber length (Ln) | mm | 0.96 | 1.03 | 0.49 | 0.96 | 0.32 |
| | Dispersity (Lw/Ln) | | 1.97 | 2.15 | 2.61 | 1.97 | 2.00 |
| Injection molding conditions | Molding temperature | ° C. | 280 | 280 | 280 | 280 | 300 |
| | Mold temperature | ° C. | 80 | 80 | 80 | 80 | 80 |
| Productibility | Strand breaking frequency | Counts | 0 | 0 | 0 | 0 | 0 |
| | Remarks | | | | | | |
| Properties | Impact resistance (Notched) | $kJ/m^2$ | 18 | 19 | 18 | 22 | 16 |
| | Tensile strength | MPa | 295 | 300 | 255 | 290 | 185 |
| | Flexural strength | MPa | 395 | 400 | 395 | 390 | 275 |
| | Flexural modulus | Gpa | 21.2 | 21.5 | 31.3 | 20.7 | 18.9 |
| | Spiral flow length | mm | 430 | 430 | 305 | 380 | 330 |
| | Appearance | Number | 0 | 0 | 0 | 0 | 0 |

| | | Example 11 | Comparative Example 9 | Comparative Example 10 | Comparative Example 11 | Comparative Example 12 |
|---|---|---|---|---|---|---|
| Sheath layer resin composition (A) | Thermoplastic resin (a1) | (a1-3) 70 | — | (a1-1) 70 | (a1-3) 70 | — |
| | Fibrous filler (b1) | (b1-1) 30 | — | (b1-1) 30 | (b1-1) 30 | — |
| Sheath layer extruding conditions | Extruding temperature | 280 | — | 260 | 280 | — |
| | Screw rotation speed | 200 | — | 50 | 200 | — |
| | Discharge rate | 3 | — | 7.5 | 7.5 | — |
| | Remarks | Biaxial mixing 2 locations | — | Biaxial mixing 2 locations | Biaxial mixing 2 locations | — |
| Sheath layer fiber length (strand) | Weight average fiber length (Lw) | 0.25 | — | 0.60 | 0.30 | — |
| | Number average fiber length (Ln) | 0.19 | — | 0.36 | 0.23 | — |
| | Dispersity (Lw/Ln) | 1.32 | — | 1.67 | 1.30 | — |
| Core layer resin composition (B) | Thermoplastic resin (a2) | (a2-2) 70 | (a2-1) 70 | (a2-1) 70 | — | (a2-2) 70 |
| | Fibrous filler (b2) | (b2-1) 30 | (b2-1) 30 | (b2-1) 30 | — | (b2-1) 30 |
| Core layer extruding conditions | Extruding temperature | 310 | 280 | 280 | — | 310 |
| | Screw rotation speed | 40 | 40 | 40 | — | 40 |
| | Discharge rate | 12 | 7.5 | 7.5 | — | 7.5 |
| | Remarks | Biaxial mixing 1 location | Biaxial mixing 1 location | Biaxial mixing 1 location | — | Biaxial mixing 1 location |
| Core layer fiber length (strand) | weight average fiber length (Lw) | 0.71 | 1.89 | 1.89 | — | 0.64 |
| | Number average fiber length (Ln) | 0.35 | 0.96 | 0.96 | — | 0.32 |
| | Dispersity (Lw/Ln) | 2.03 | 1.97 | 1.97 | — | 2.00 |
| Injection molding conditions | Molding temperature | 300 | 280 | 280 | 300 | 300 |
| | Mold temperature | 80 | 80 | 80 | 80 | 80 |
| Productibility | Strand breaking frequency | 0 | Impossible to take up | 36 | 0 | 24 |
| | Remarks | | Fluff generated | Fluff generated | | Fluff generated |

TABLE 2-continued

| | | | | | | |
|---|---|---|---|---|---|---|
| Properties | Impact resistance (Notched) | 18 | — | 18 | 11 | 17 |
| | Tensile strength | 190 | — | 255 | 170 | 155 |
| | Flexural strength | 275 | — | 360 | 260 | 250 |
| | Flexural modulus | 18.6 | — | 20.9 | 18.1 | 18.6 |
| | Spiral flow length | 325 | — | 395 | 340 | 305 |
| | Appearance | 0 | — | 6 | 0 | 5 |

Examples 6 to 11 and Comparative Examples 9 to 12 show that even when a core layer resin composition (B) is melt kneaded in a twin-screw extruder, a fiber-reinforced multilayered pellet containing a fibrous filler (b2) having a weight-average fiber length (Lw) of 0.5 mm to less than 15.0 mm and a weight-average fiber length/number-average fiber length ratio (Lw/Ln) of 1.8 to less than 5.0 is produced similarly to the above, and the pellet exhibits high productivity, significantly improved impact resistance, high flowability, and excellent appearance.

INDUSTRIAL APPLICABILITY

The fiber-reinforced multilayered pellet can be used various applications such as interior parts for automobiles, exterior parts for automobiles, sports equipment parts, and housings, chassis, and internal parts for various electrical and electronic components.

The invention claimed is:

1. A fiber-reinforced multilayered pellet comprising:

a sheath layer; and a core layer, the sheath layer comprising a resin composition comprising a thermoplastic resin (a1) and a fibrous filler (b1), wherein the fibrous filler (b1) has a weight-average fiber length (Lw) of 0.1 mm to less than 0.5 mm and a weight-average fiber length/number-average fiber length ratio (Lw/Ln) of 1.0 to less than 1.8, the core layer comprising a resin composition comprising a thermoplastic resin (a2) and a fibrous filler (b2), wherein the fibrous filler (b2) has a weight-average fiber length (Lw) of 0.5 mm to less than 15.0 mm and a weight-average fiber length/number-average fiber length ratio (Lw/Ln) of 1.8 to less than 5.0.

2. The fiber-reinforced multilayered pellet according to claim 1, wherein the resin composition constituting the sheath layer comprises 40 to 95% by weight of the thermoplastic resin (a1) and 5 to 60% by weight of the fibrous filler (b1).

3. The fiber-reinforced multilayered pellet according to claim 2, wherein the resin composition constituting the core layer comprises 40 to 95% by weight of the thermoplastic resin (a2) and 5 to 60% by weight of the fibrous filler (b2).

4. The fiber-reinforced multilayered pellet according to claim 2, wherein at least one of the fibrous filler (b1) in the sheath layer and the fibrous filler (b2) in the core layer comprises at least one selected from the group consisting of glass fibers, polyacrylonitrile-based carbon fibers, pitch-based carbon fibers, and stainless steel fibers.

5. A molded article produced by molding the fiber-reinforced multilayered pellet according to claim 2.

6. A method of producing the fiber-reinforced multilayered pellet according to claim 2, comprising:

melt-kneading the resin composition constituting the sheath layer and the resin composition constituting the core layer separately, and discharging the resin compositions through a crosshead die to form a multilayer structure.

7. The fiber-reinforced multilayered pellet according to claim 1, wherein the resin composition constituting the core layer comprises 40 to 95% by weight of the thermoplastic resin (a2) and 5 to 60% by weight of the fibrous filler (b2).

8. The fiber-reinforced multilayered pellet according to claim 7, wherein at least one of the fibrous filler (b1) in the sheath layer and the fibrous filler (b2) in the core layer comprises at least one selected from the group consisting of glass fibers, polyacrylonitrile-based carbon fibers, pitch-based carbon fibers, and stainless steel fibers.

9. A molded article produced by molding the fiber-reinforced multilayered pellet according to claim 7.

10. A method of producing the fiber-reinforced multilayered pellet according to claim 7, comprising:

melt-kneading the resin composition constituting the sheath layer and the resin composition constituting the core layer separately, and discharging the resin compositions through a crosshead die to form a multilayer structure.

11. The fiber-reinforced multilayered pellet according to claim 1, wherein at least one of the fibrous filler (b1) in the sheath layer and the fibrous filler (b2) in the core layer comprises at least one selected from the group consisting of glass fibers, polyacrylonitrile-based carbon fibers, pitch-based carbon fibers, and stainless steel fibers.

12. A molded article produced by molding the fiber-reinforced multilayered pellet according to claim 11.

13. A method of producing the fiber-reinforced multilayered pellet according to claim 11, comprising:

melt-kneading the resin composition constituting the sheath layer and the resin composition constituting the core layer separately, and discharging the resin compositions through a crosshead die to form a multilayer structure.

14. A molded article produced by molding the fiber-reinforced multilayered pellet according to claim 1.

15. A method of producing the fiber-reinforced multilayered pellet according to claim 1, comprising:

melt-kneading the resin composition constituting the sheath layer and the resin composition constituting the core layer separately, and discharging the resin compositions through a crosshead die to form a multilayer structure.

16. A fiber-reinforced multilayered pellet comprising:

a thermoplastic resin (a3); and a fibrous filler (b3), wherein the fibrous filler at a surface part of the pellet has a weight-average fiber length (Lw) of 0.1 mm to less than 0.5 mm and a weight-average fiber length/number-average fiber length ratio (Lw/Ln) of 1.0 to less than 1.8, and wherein the fibrous filler at a central part of the pellet has a weight-average fiber length (Lw) of 0.5 mm to less than 15.0 mm and a weight-average fiber length/number-average fiber length ratio (Lw/Ln) of 1.8 to less than 5.0.

17. The fiber-reinforced multilayered pellet according to claim 16, wherein the fibrous filler comprises at least one selected from the group consisting of glass fibers, polyacrylonitrile-based carbon fibers, pitch-based carbon fibers, and stainless steel fibers.

18. A molded article produced by molding the fiber-reinforced multilayered pellet according to claim 17.

19. A molded article produced by molding the fiber-reinforced multilayered pellet according to claim 16.

* * * * *